Feb. 4, 1969 G. E. FRIG ET AL 3,425,067
RESILIENT SEAT PLATFORM WITH INTEGRAL MEANS
FOR ATTACHMENT TO A FRAME
Filed July 18, 1966

INVENTORS.
GERALD E. FRIG
PHILIP T. HEUSTON &
BY MARIO F. THUMUDO, JR.

Eyre, Mann & Lucas
ATTORNEYS.

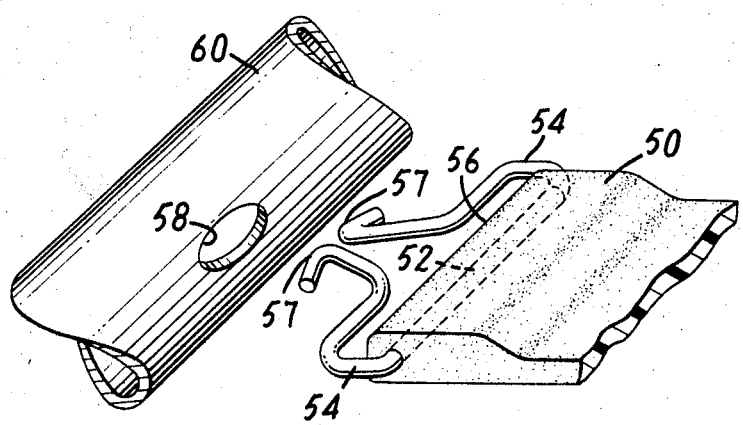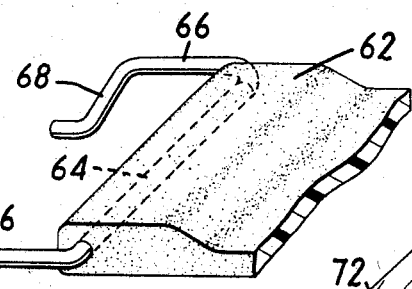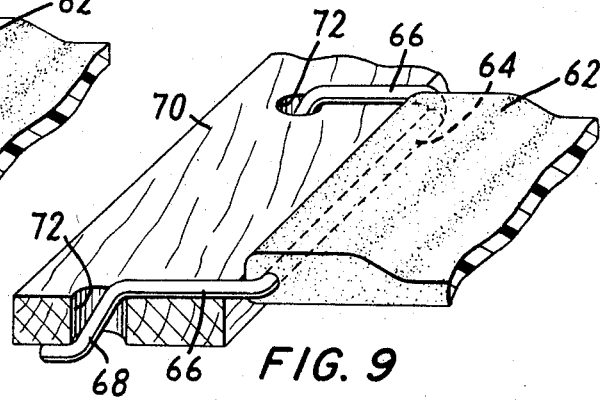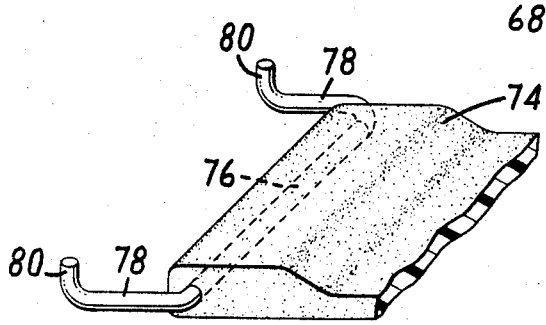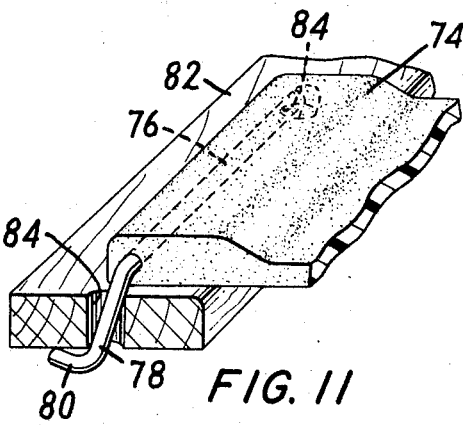

United States Patent Office 3,425,067
Patented Feb. 4, 1969

3,425,067
RESILIENT SEAT PLATFORM WITH INTEGRAL MEANS FOR ATTACHMENT TO A FRAME
Gerald E. Frig, Warren, Mich., and Philip T. Heuston, Marion, and Mario F. Thumudo, Jr., Fairhaven, Mass., assignors of one-half each to Acushnet Process Company, a corporation of Massachusetts, and General Motors Corporation, a corporation of Delaware
Filed July 18, 1966, Ser. No. 565,988
U.S. Cl. 5—186     10 Claims
Int. Cl. A47c *17/86, 31/00*

ABSTRACT OF THE DISCLOSURE

A seat platform is constructed by providing an elastomeric sheet with a plurality of rod elements, each having a main portion completely buried in the sheet adjacent a peripheral edge thereof, integral side portions extending from the opposite ends of the main portion toward the peripheral edge and integral terminal portions spaced from the peripheral edge. The integral terminal portions of each rod element are adapted to be retained by suitable mechanical means on a frame to which the platform is to be attached, whereby after such attachment the portions of the sheet disposed between the integral side portions of the rod elements are guarded against potentially damaging contact with the frame.

---

This invention relates to platforms for seats, chairs, sofas and/or other seating fixtures and devices, such as those found in automobiles, marine vessels and aircraft, which may utilize a platform as an inner support or foundation for other parts of the finished structure. More particularly, the invention relates to platforms of elastomeric material having improved integral means for attaching the platform to a supporting frame.

Platforms of the nature described above have recently become popular in the art because, as substitutes for conventional spring supports for seats, elastomeric platforms are less expensive and simpler to fabricate and install. In such devices, a sheet of elastomeric material usually is provided with peripheral tabs which are attached to an outer rigid frame to form a supporting platform for a pad, cushion or similar seat top. Very often the tabs, after attachment, are disposed within a slot or some other opening in the frame and the tabs have freedom to move considerably relative to the frame opening. This causes problems since the elastomeric material of the tab can be readily damaged by rubbing, cutting or tearing actions as it moves against the edges of the frame opening which are usually rough cut and therefore all the more prone to cause damage.

Further problems are often caused by the fact that the tabs may be provided with attachment elements which are retained primarily by adhesive bonding to the elastomeric material and, under the considerable stresses which are applied to the platform during use in certain applications, the adhesive bonds may be broken whereby there may be a general failure in the attachment of the platform to the outer frame.

The present invention overcomes the problems noted above and provides a new form of elastomeric platform in which integral attachment means in the form of rod elements are molded into the elastomeric sheet adjacent peripheral edges thereof. These rod elements, when placed within cooperative openings in a supporting frame, first of all can be immobilized or severely restricted against relative movement in relation to the frame opening and, secondly, prevent contact between the edges of the frame opening and vulnerable portions of the elastomeric platform even with occurrence of any relative movement, whereby damage to the elastomeric material is avoided in any case. Such beneficial results are achieved by use of a rod element having a main portion which is completely buried in the elastomeric sheet of the platform adjacent a peripheral edge thereof. Each rod element also includes integral side portions which extend from the ends of the buried main portion in directions leading to the adjacent peripheral edge of the elastomeric sheet. The integral side portions of the rod elements in turn have integral terminal portions which are constructed to be retained by cooperating openings in the frame to which the elastomeric sheet is to be attached.

By the foregoing construction, rod elements can be made which have little or no freedom of movement once they have been attached to the frame by inserting the integral terminal portions of the rod element in a suitable opening in the frame. Such restriction against relative movement is provided by the integral side portions of the rod elements which can be dimensioned to snugly fit against the facing edges of the frame opening to eliminate any play between the mating parts. This in turn prevents relative movement between the frame opening and the elastomeric sheet which otherwise could possibly damage the sheet.

Furthermore, even if relative movement should be possible and actually occur, no damage can be caused to the portion of elastomeric material located between the integral side portions of the rod elements because contact by the edges of the frame opening upon the elastomeric material is prevented by the intervening integral side portions of the rod element. Thus, relative movement between the described parts results in harmless contact of the edges of the frame opening upon the integral side portions of the rod element, and the elastomeric material remains isolated and protected within the guarded span of the outer integral portions. This is a highly important feature of the invention since it is such guarded portions of the elastomeric sheet which are directly responsible for anchoring the buried main portion of each rod element and maintaining the rod element securely buried in the elastomeric sheet.

A further advantage of the improved platform of the invention is that the main buried portions of the rod element can be readily mounted by molding the elastomeric sheet around the rod element as an inherent part of the molding operation for the entire elastomeric sheet. Another advantage is the fact that the rod element need not be adhered or otherwise bonded to the material of the elastomeric sheet to form an effective attachment assembly. To the contrary, in many embodiments of the invention, it is a distinct advantage that the rod element is free to pivot about the axis along which its main portion is buried in the elastomeric sheet as will be more fully explained hereafter. Thus, the buried main portion of the rod element of the invention may or may not be bonded to the elastomeric material of the platform sheet.

As previously described, the integral side portions of the rod elements provide a critically important movement limiting and shielding function. This function can be achieved with various configurations for the outer integral portions. For example, where the rod elements are mounted in integral tab elements jutting out from the periphery of the elastomeric sheet, the integral side portions can be rod shaped and can extend from the ends of the buried main portion toward but short of the peripheral edge of the tab element. However, such a configuration, while in some cases useful, leaves a portion of each side of the tab element unshielded for possible cutting, tearing or other damage, and therefore is the least desirable. Hence, for best results it is necessary that the integral side portions of the rod elements extend to points at least coextensive with the peripheral edge of the tab element, whereby the opposite sides of the tab element are virtually completely shielded against contact with edges of the frame opening which might move towards the sides of the tab element during normal use of the platform. Finally, in certain other embodiments of the invention, as for example, where the rod elements are mounted adjacent the peripheral edge of an elastomeric sheet which does not have tab elements, the integral side portions of the rod elements can extend beyond the peripheral edge of the elastomeric sheet, or of a tab element if one is used, to provide maximum shielding for the portion of elastomeric material located between the integral side portions and also to space the integral terminal portions in positions farther out from the peripheral edge.

As for the integral terminal portions of the rod elements, these are in all cases spaced to some degree from the peripheral edge of the guarded portion of elastomeric material between the integral side portions of the rod elements. The integral terminal portions are constructed with various configurations to be received in suitably-shaped openings in the supporting frame which will mechanically mate with and thereby retain the integral terminal portions. For example, the integral terminal portions may be constructed as straight rods, hooks, S-curves, loops, barbs, etc., and inserted in frame openings such as T-slots, holes, channels, raised tabs, ledges, etc., which will mechanically lock the terminal portions to the frame. Preferably the integral terminal portions are attached to the frame with stretching at least of the adjacent elastomeric material to provide a return force of tension which will increase the mechanical lock between the integral terminal portions and the frame openings. The rod elements are preferably made of metal by cold forming, stamping, drawing, bending and other conventional metal working techniques. The elastomeric sheet with its integral tab members is molded out of any elastomeric material having sufficient elasticity and strength to serve as a seat platform, and is also made by conventional techniques.

As previously mentioned, the rod elements are mounted in the elastomeric sheet by molding the sheet about the main portion of the rod elements to bury the same. This generally will leave all of the integral terminal portions and some or all of the integral side portions uncovered. However, it is not of disadvantage if the integral terminal and side portions become covered by elastomeric material, as for example, by mold "flash," since any cutting or tearing of elastomeric material on these portions cannot cause damage upon the anchoring portion of elastomeric material which remains guarded between the integral side portions.

Further details of the invention will be readily understood by reference to the accompanying drawings which illustrate several embodiments thereof and of which:

FIG. 7 is a perspective view of a third embodiment of a tab element with a rod element and of a frame with a suitable opening for attachment of the tab element thereto.

FIG. 8 is a perspective view of a fourth embodiment of a tab element with a rod element.

FIG. 9 is a perspective view of the attachment of the tab element of FIG. 8 to a suitable opening in a frame.

FIG. 10 is a perspective view of a fifth embodiment of a tab element with a rod element.

FIG. 11 is a perspective view of the attachment of the tab element of FIG. 10 to a suitable opening in a frame.

Figure 1:
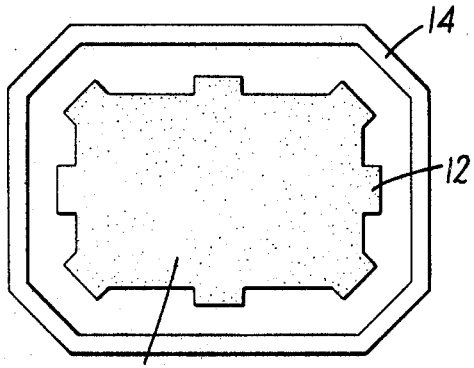
FIG. 1 is a top plan diagrammatic view of an elastomeric sheet with tabs in position for attachment to an outer supporting frame.

Referring to FIG. 1, numeral 10 indicates a sheet of elastomeric material having a plurality of integral tab elements 12 located along the periphery of the sheet. The elastomeric sheet 10 is positioned within the confines of an outer supporting frame 14 to which the sheet 10 is to be attached in order to form a supporting platform for a pad, seat, cushion or other upper part. The present invention provides new and advantageous means for attaching a platform such as the one illustrated in FIG. 1 to a supporting frame.

Figure 2:
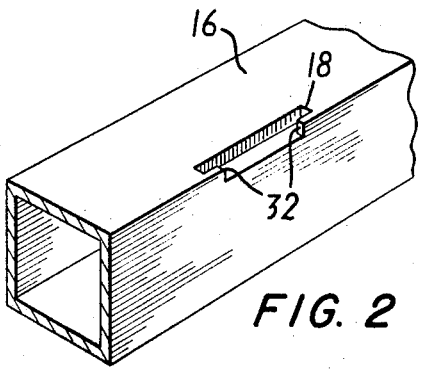
FIG. 2 is an enlarged perspective view of a portion of supporting frame with one suitable form of opening to receive a rod element.

Referring to FIG. 2, a portion of a frame 16 is illustrated in perspective, the frame having the configuration of a box. The upper inner corner of the frame 16 is cut to provide a T-shaped slot 18.

Figure 3:
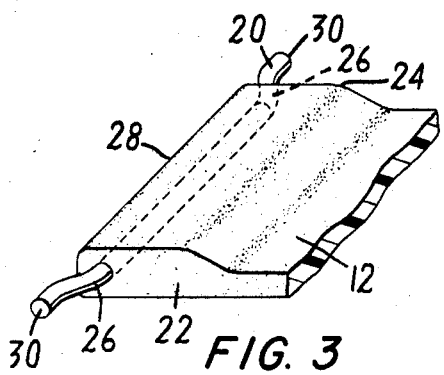
FIG. 3 is also an enlarged perspective view of a tab element having a rod element which may be retained in the frame opening of FIG. 2.

Referring to FIG. 3, the tab element 12 is provided with a rod element 20 a main portion of which is molded within the body of the tab element 12 and extends through the body along an axis projecting out from opposite sides 22 and 24 of the tab element. The rod element 20 includes integral side portions 26 which extend from the ends of the main portion towards the outer peripheral edge 28 of the tab element. The rod element 20 includes integral terminal portions 30 which in this case are in the form of straight rods the lengths of which are aligned in a common axis which is parallel to the axis along with the main portion of the rod element extends through the body of tab element 12.

Figure 4:
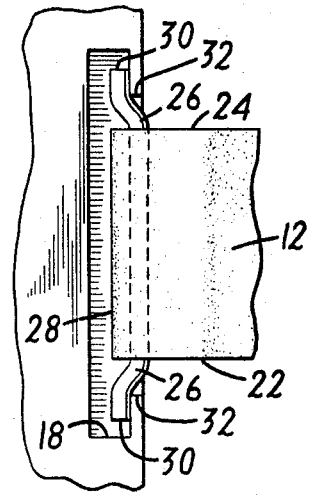
FIG. 4 is a top plan view of the attachment of the tab element of FIG. 3 to the frame opening of FIG. 2.

In attaching the tab element 12 to the frame 16, the integral terminal portions 30 are placed down behind the upstanding corners 32 which define the T-slot 18. As illustrated in FIG 4 the integral terminal portions 30 are mechanically retained by the corners 32, preferably under tension derived from stretching the tab element 12, so that a secure mechanical lock is achieved between the tab element 12 and the slot 18. As shown in FIG. 3 the rod element 20 is molded into the tab element 12 in such manner that a common plane passing through the main portion, the integral side portions 26 and the integral terminal portions 30 of the rod element is oriented at an angle to a plane passing through the thickness of the tab element, measuring from the intersection of the planes out toward the peripheral edge of the tab element. However, when the integral terminal portions 30 of the rod element 20 are dropped in the T-slot 18, the rod element pivots about the axis along which it extends through the body of the tab element and in this way some of the tension and stretching required to position the integral terminal portions 30 behind the corners 32 of the T-slot 18 is relieved as the rod element pivots. This also causes the rod element 20 to automatically assume a secure locked position within the T-slot 18 since as the tension is slightly relieved by pivoting of the rod element, the integral terminal portions 30 are pulled snugly against locking inner surfaces of the corners 32 and the tab element 12 will be securely locked in place within the frame 16.

Referring to FIG. 4, the integral side portions 26 of the rod element 20 occupy the free space between the opposite sides 22 and 24 to prevent or restrict relative movement between the tab element and the facing edges of the corners 32. Even if movement should take place, the facing edges of the corners 32 can only contact the integral side portions 26 of the rod element 20 and cannot cut, tear or penetrate into the guarded anchoring portion of elastomeric material located between the integral side portions.

Figure 5:
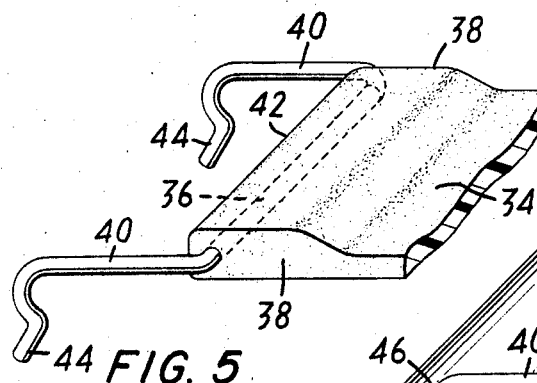
FIG. 5 is a perspective view of a second embodiment of a tab element with a rod element.

Referring to FIG. 5, a second embodiment of tab element 34 is there illustrated with a rod element 36 which extends completely through the tab element 34 and out through opposite sides 38 thereof. The rod element 36 includes integral side portions 40 which are straight rods the lengths of which are aligned substantially perpendicular to the buried main portion of the rod element. The integral side portions 40 extend beyond the peripheral edge 42 most distant from the periphery of the entire elastomeric sheet of which tab element 34 is an integral part. The integral side portions 40 have integral terminal portions 44 which are L-shaped rods with a straight base and a curved leg.

Figure 6:
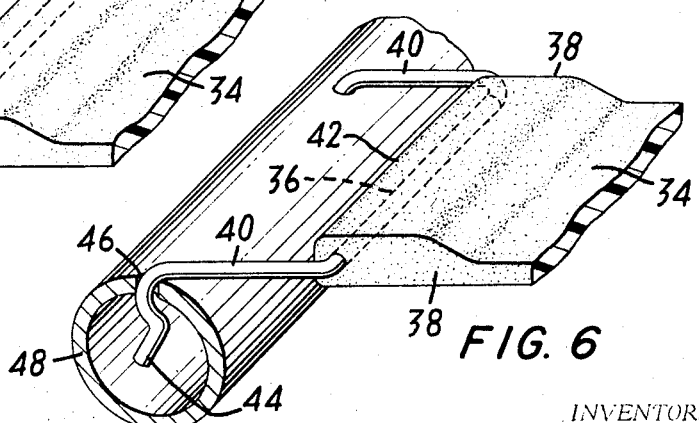
FIG. 6 is a perspective view of the attachment of the tab element of FIG. 5 to a suitable opening in a frame.

Referring to FIG. 6, the integral terminal portions 44 of tab element 34 are inserted into the holes 46 in a tubular supporting frame 48. Again tension is preferably applied by stretching the tab element when inserting the integral terminal portions 44 in the holes 46 to establish a return force of tension which will maintain the integral terminal portions securely within the holes. Also, if the integral side portions 40 should pivot downwardly in relation to the tubular frame 48, the straight base of the integral terminal portions 44 will bear against the inside wall of the tubular frame to prevent such portions from retracting out of the holes 46.

Referring to FIG. 7, another embodiment of tab element 50 is there illustrated with the rod element 52 buried and extending through the body of the tab element 50 as previously described. The rod element 52 includes the integral side portions 54 which extend beyond the peripheral edge 56 of the tab element 50. The integral side portions 54 include terminal portions 57 which have the shape of barbs. The integral terminal portions 57 are inserted into a hole 58 provided in a tubular supporting frame 60. This forces the barbs 57 to bend more closely together as they pass through the wall of the opening 58 and as soon as the tips of the barbs are clear of the side wall of the opening 58, the barbs spring back outwardly to come into contact with the inner wall of the frame 60. Again preferably the tab element 50 is stretched as the barbs are inserted in the hole 58 whereby a return force of tension will maintain the tips of the barbs in locking contact with the inner wall of the tubular frame 60.

Referring to FIG. 8, another embodiment of tab element 62 is there illustrated having a rod element 64 which as in the previous embodiments is buried in and extends completely through the body of the tab element. The rod element 64 includes the integral side portions 66 which are straight rods the lengths of which are substantially perpendicular to the buried main portion of the rod element 64. The integral side portions 66 include integral terminal portions 68 which have an elongated S-shaped configuration.

Referring to FIG. 9, tab element 62 is attached to a frame 70 by inserting the S-shaped terminal portions 68 into holes 72 which have diameters generally the same as the distance spanned by the central elongated portion of the S-shaped terminal portions 68. As shown in FIG. 9, a retracting force of tension in the tab element 62 tends to pivot the trailing tip of the S-shaped terminal portions 68 upwardly in relation to the frame 70. However, the tip of the S-shaped terminal portion remains securely locked against the bottom inner wall of the frame 70 and the tab element 62 remains securely attached to the frame 70. As a mater of fact, the pressure of the mechanical interlock will be increased as additional tension is applied from the tab element 62.

Referring now to FIG. 10, a further embodiment of tab element 74 is there illustrated with a rod element 76 extending through the body of the tab element as in the previous embodiments. The rod element 76 includes integral side portions 78 which are again straight rods the lengths of which are oriented substantially perpendicular to the buried main portion of rod element 76. The integral side portions 78 include the integral terminal portions 80 which are also straight rods the lengths of which are oriented substantially perpendicular to the lengths of the integral side portions 78. The integral side portions 78 and the integral terminal portions 80 in this embodiment define an L-shape having a short base and an elongated leg.

In attaching the tab element 74 to a frame 82 the integral side portions 78 are pivoted so that the short base of the integral terminal portions 80 may be inserted down into holes 84 having diameters generally the same or slightly greater than the lengths of the short base. After the integral terminal portions have been inserted beyond the bottom inner wall of the frame 82, a return force of tension will attempt to pivot the short base upwardly out of the holes 84. However, due to the mechanical interlock illustrated in FIG. 11, the L-shape of the integral side portions 78 and integral terminal portions 80 will remain securely locked in any beyond the holes 84 to provide secure attachment of the tab element 74 to the frame 82. Also, in this embodiment, the bottom of the tab element will remain resting upon the top surface of the frame 82 but this is not of any disadvantage since contact will be established between large surface areas of the respective portions and there is no danger of a sharp edge of the frame 82 cutting, tearing or otherwise digging into the tab element 74. Additionally, the frame 82 in this particular embodiment can provide reinforcement and additional support for the tab elements 74.

Figure 12:
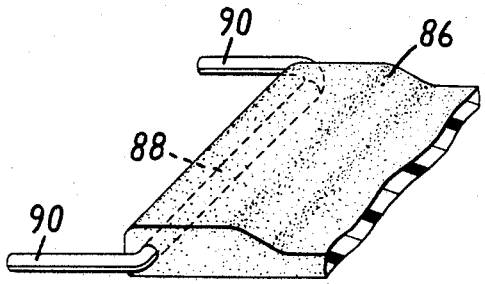
FIG. 12 is a perspective view of a sixth embodiment of a tab element with a rod element.
Figure 13:
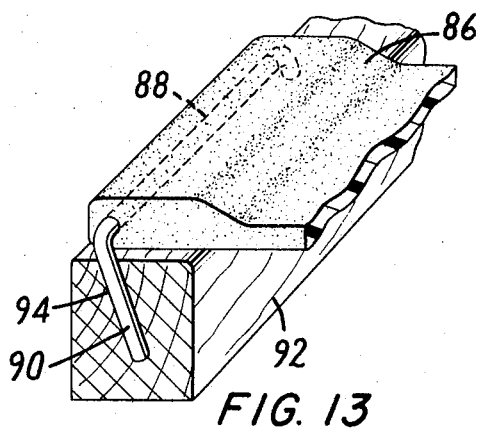
FIG. 13 is a perspective view of the attachment of the tab element of FIG. 12 to a suitable opening in a frame.

Referring now to FIG. 12, another form of tab element 86 is there illustrated with a rod element 88 extending through the body of the tab element similar to the previous embodiments. The rod element 88 includes integral side portions 90 which in this embodiment also comprise the integral terminal portions which are merely continuations or extensions of the integral side portions 90. The combined integral side portions-integral terminal portions 90 have the configuration of straight rods the lengths of which are disposed substantially perpendicular to the buried main portion of the rod element 88.

In attaching the tab element 89 to a frame 92, the rod element 88 is pivoted so that the combined integral side portions-integral terminal portions 90 may be inserted into wells 94 extending down into the body of the frame 92 at reverse angle pointing back towards the elastomeric sheet of which tab elements 86 are integral parts. Thus, after the combined integral side portions-integral terminal portions 90 are inserted and seated in the wells 94, the top of the frame will bear up against the bottom of tab element 86 and the retracting force of tension will tend to pivot the element 90 back towards the outside of the frame 92. However, the combined portions 90 are mechanically locked in the wells 94 and cannot pivot, so that the tab 86 remains securely attached to the frame 92.

Figure 14:
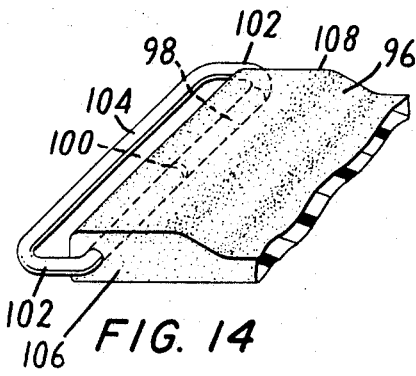
FIG. 14 is a perspective view of a seventh embodiment of a tab element with a rod element.

Referring now to FIG. 14, another embodiment of tab element 96 is there shown with a rod element 98 which is somewhat different from the previous embodiments of rod elements. Rod element 98 includes buried portions within the body of the tab 96 but these portions are discontinuous, being separated by a space 100 centrally located in the body of the tab 96. The rod element 98 includes integral side portions 102 which are in the form of straight rods the lengths of which are substantially perpendicular to the axis along which rod element 98 extends into the body of the tab element 96. The integral side portions 102 are joined by a common integral terminal portion 104, whereby the rod element 98 extends continuously from one side 106 to the opposite side 108 of tab element 96.

Figure 15:
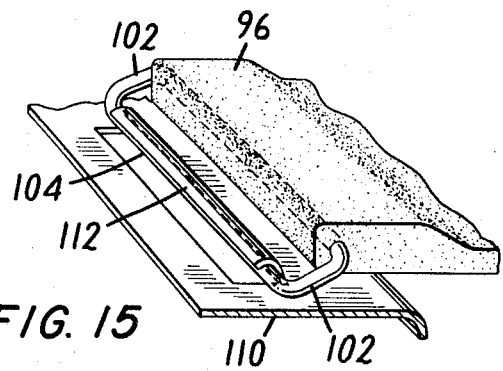
FIG. 15 is a perspective view of one form of attachment of the tab element of FIG. 14 to a frame.

Referring now to FIG. 15, one method of attaching the tab element 96 to a frame 110 is there illustrated. A portion of the frame is cut and bent upwardly to form a curved tab 112. The tab element 96 is stretched until the common integral portion 104 can be caught behind the tab 112 and thereafter the retracting force of tension will maintain the common integral portion 104 securely locked behind the tab 112. Also, a substantial portion of the bottom surface of tab element 96 is supported and reinforced by the inner portion of frame 110.

Figure 16:
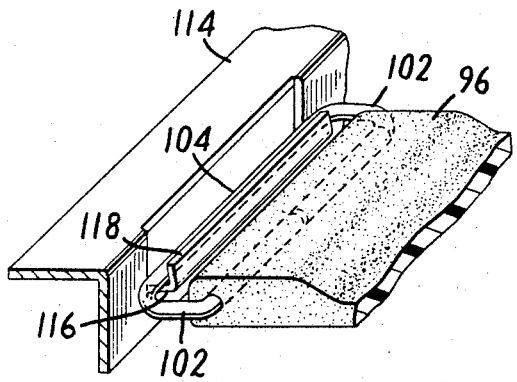
FIG. 16 is a perspective view of a second form of attachment of the tab element of FIG. 14 to a frame.

Referring to FIG. 16, another form of attachment of the tab element 96 to a frame 114 is there illustrated. A portion of the side wall of frame 114 is cut and bent, first outwardly to form a ledge 116, and then upwardly to form a front retaining wall 118. The common integral portion 104 of the rod element 98 is placed behind the front wall 118 and upon the ledge 116. A return force of tension in the stretched tab element 96 will maintain the common integral portion securely locked behind the retaining front wall 118 of the ledge 116. In this embodiment, no part of the tab element is contacted or supported by the frame 114 so that the rod element 98 is free to pivot about the axis along which it extends into the body of the tab element 96.

Figure 17:
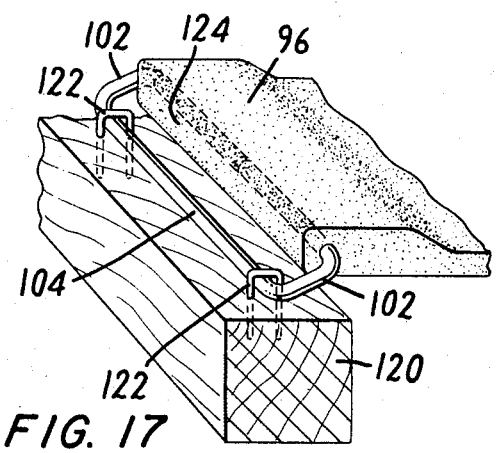
FIG. 17 is a perspective view of a third form of attachment of the tab element of FIG. 14 to a frame.

Referring now to FIG. 17, another form of attachment of tab element 96 to a frame 120 is there illustrated. As illustrated the bottom surface of the tab element 96 is placed upon the top surface of frame 120 and the common integral portion 104 of the rod element 98 is pivoted down also into contact with the top surface of frame 120. While the top element 96 is maintained under tension by stretching, the common integral portion 104 to the rod element 98 is stapled as at 122 and locked in place upon the top surface of the frame 120. The return force of tension in the tab element 96 will prevent the staples from coming into contact with the outer peripheral edge 124 of the tab element 96.

As illustrated in the foregoing drawings, the body portions of the various embodiments of the tab elements are preferably made thicker than the rest of the elastomeric sheet in order to provide a reinforced, tough matrix or housing for the various rod elements. In the case of sheets which do not have tab elements, the portions of elastomeric material in which the rod elements are buried adjacent peripheral edges may also be thickened. Since the rod elements of the invention cannot fail as long as the anchoring portion of elastomeric material in which they are buried remains intact, thickening of the material will help to prevent tearing, ripping or other disruption which might result in a general failure of the attachment of the sheet to the supporting frame.

It will be understood that it is intended to cover all changes and modifications of the preferred embodiments of invention, herein chosen for the purpose of illustration, which do not constitute departures from the spirit and scope of the invention.

We claim:

1. A seat platform for attachment to a frame comprising a sheet of elastomeric material, a plurality of rod elements, each said rod element having a main portion which is completely buried in said sheet adjacent a peripheral edge thereof, each said main portion having integral side portions which extend from the opposite ends of said main portion towards said peripheral edge, said integral side portions ending in integral terminal portions having substantially straight lengths which are substantially coincident with a common axis and which extend in opposite directions away from each other along said common axis, and said integral terminal portions being adapted to be retained by mechanically mating means on the frame to which said sheet is to be attached, whereby the portions of said elastomeric sheet located between said integral side portions are guarded against damaging contact with said frame.

2. A platform as in claim 1 wherein each said rod element is buried in a tab portion that is integral with and juts out from said elastomeric sheet.

3. A platform as in claim 1 wherein said peripheral edge is straight and said common axis is substantially parallel thereto.

4. A platform as in claim 1 wherein said buried main portion also has a straight length which is substantially parallel to said common axis, and said integral side portions also have straight lengths which extend from the opposite ends of said main portion and intersect said common axis of the integral terminal portions at angles other than right angles.

5. A platform as in claim 4 wherein said integral side portions are of such length that said integral terminal portions do not extend beyond said peripheral edge.

6. A platform as in claim 4 wherein said straight length of the buried main portion and said straight lengths of the integral side portions and said common axis of the integral terminal portions are spatially oriented so as to be contained in a common plane.

7. A platform as in claim 6 wherein said common plane is spatially oriented so as to intersect a plane passing through the thickness of said sheet at an acute angle measuring from the point of intersection out to said peripheral edge.

8. A platform as in claim 6 wherein each said rod element is pivotable within said sheet about an axis coincident with said straight length of the buried main portion.

9. A seat platform-frame assembly comprising an outer frame of rigid material, a sheet of elastomeric material disposed within the confines of said frame, a plurality of rod elements, each said rod element having a main portion which is completely buried in said sheet adjacent a peripheral edge thereof, each said main portion having integral side portions which extend from the opposite ends of said main portion towards said peripheral edge, said integral side portions ending in integral terminal portions having substantially straight lengths which are substantially coincident with a common axis and which extend in opposite directions away from each other along said common axis, a plurality of T-shaped slots in said frame, said straight lengths of the integral terminal portions of each rod element being inserted into the top opening of one of said T-shaped slots so as to be retained behind the portions of the frame extending inwardly together beneath the top opening of the T, whereby the portions of said elastomeric sheet located between said integral side portions are guarded against damaging contact with said frame.

10. A seat platform-frame assembly as in claim 9 wherein said elastomeric sheet is stretched at least in the vicinity of said rod elements to establish a return force of tension which acts to more securely retain said straight lengths in said T-shaped slot.

References Cited

UNITED STATES PATENTS

| | | | |
|---|---|---|---|
| 2,884,994 | 5/1959 | Rosalsky | 160—404 |
| 3,142,515 | 7/1964 | Wall et al. | 297—452 |
| 3,179,469 | 4/1965 | Heuston | 160—382 X |
| 3,205,628 | 9/1965 | Frisk | 160—354 X |
| 3,217,786 | 11/1965 | Earl | 160—404 |
| 3,225,366 | 12/1965 | Grimshaw | 5—236 |

BOBBY R. GAY, *Primary Examiner.*

R. D. KRAUS, *Assistant Examiner.*